Dec. 22, 1931.  G. E. THOMAS ET AL  1,837,240
CRANK CASE OIL GAUGE
Filed Jan. 28, 1931
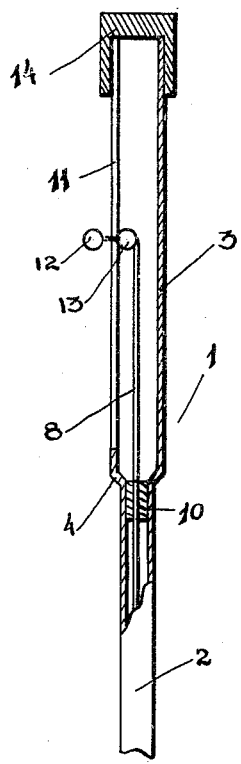
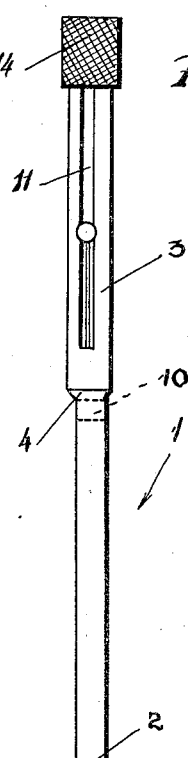
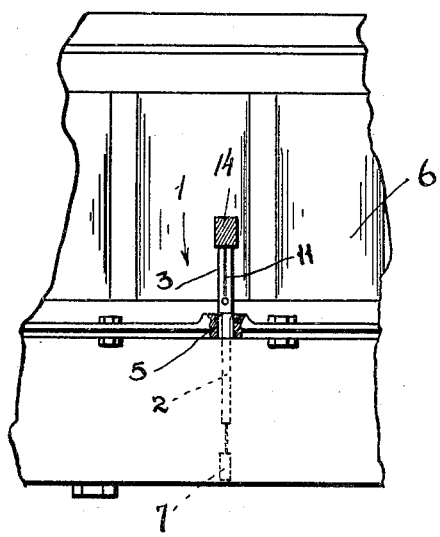
INVENTORS
GEORGE E. THOMAS.
LLOYD S. THOMAS.
BY
ATTORNEY.

Patented Dec. 22, 1931

1,837,240

UNITED STATES PATENT OFFICE

GEORGE E. THOMAS AND LLOYD S. THOMAS, OF LONG BEACH, CALIFORNIA

CRANK CASE OIL GAUGE

Application filed January 28, 1931. Serial No. 511,705.

This invention relates to a crank case oil gauge particularly applicable for automobiles and trucks.

One object of our invention is to provide an oil gauge which can be readily inserted and removed in the opening usually provided in the crank case for the measuring stick. That is, our gauge takes the place of the measuring stick.

Another object of our invention is to provide a gauge which is simple in construction, inexpensive to manufacture, and effective in operation.

Still another object is to provide an oil gauge for the crank case of an automobile engine which can be mounted or removed for repair without removing the crank case, or other component part of the engine.

Other objects, advantages, and features of invention may appear from the accompanying drawings, the subjoined detailed description, and the appended claims.

In the drawings,

Figure 1 is a side elevation of our gauge, partly in section.

Figure 2 is a fragmentary, longitudinal, sectional view of the upper part of our gauge.

Figure 3 is a fragmentary, side elevation showing an engine without gauge mounted thereon.

Referring more particularly to the drawings, our gauge 1 consists of a tube 2 of uniform outside diameter, which is adapted to extend downwardly into the engine crank case, substantially as shown in Figure 3. An indicator tube 3, somewhat larger in outside diameter than the tube 2, is positioned on the top of the tube 2. The tubes 2—3 may be integrally formed, or they may be separate pieces and welded, soldered or brazed together.

A shoulder 4 is thus formed between the tubes 2—3, and the purpose of this shoulder is to fit tightly with a wedging action in the gauge opening 5 of the engine 6. This opening is usual in automobiles and truck engines, and a stick usually fits in this opening, which is removed to determine the quantity of oil in the crank case of the engine. Our gauge is inserted or removed through this opening and the gauge tube 3 projects above the opening so that it can be readily seen, and the quantity of oil ascertained, as will be further described.

A float 7 which may be of cork, or of a hollow metallic construction, is positioned within the crank case, and rests in the oil, as will be evident. A fine, flexible spring wire 8 is adapted to be attached to the float 7 and extends upwardly through the tubes 2—3. Plugs 9—10 are provided at the bottom and top respectively of the tube 2 for the purpose of guiding the wire 8 in its movement. A slot 11 is cut in the tube 3 and extends vertically therein.

A pair of beads 12—13 is attached to the upper end of the wire 8, one bead is on the inside of the tube 3, and the other is on the outside. The wire which connects the two beads extends through the slot 11. Thus the wire is guided at the top and there is little likelihood of the wire catching and hanging up on some obstruction. A cap 14 is pressed, or otherwise secured on the top of the tube 3.

The float 7 is substantially the same outside diameter as the tube 2, and therefore the entire assembly can be inserted or removed through the gauge opening 5. Our gauge can be as readily inserted and removed as the ordinary measuring stick which has been in use heretofore, and therefore no expensive installation cost is necessary.

Having described our invention, we claim:

1. In a crank case oil gauge, a tube comprising upper and lower sections, said upper section being of larger outside diameter than the lower section, so that the gauge may be supported with the upper section outside of the crank case, said lower section having an opening at the lower end thereof, a float, a wire extending from the float into said tube, said upper section having a vertical slot therein said wire being bent to extend through said slot, a bead attached to the upper end of said wire and positioned on the outside of the slot, a cap closing the top of the tube, said gauge being adapted to be inserted and removed through the oil gauge hole in a crank case.

2. In a crank case oil gauge, a tube comprising a lower section, an upper gauge section, said upper gauge section being of greater outside diameter than the lower section so that the gauge may be supported with the upper section outside of the crank case, said lower section having an opening at the lower end thereof, a float, said float being substantially the same outside diameter as said lower section, a wire extending from the float into the tube, guide plugs in the tube through which said wire extends, said upper gauge section having a vertical slot formed therein, a pair of spaced beads on the upper end of the wire, one of said beads being on the outside of the slot and the other on the inside, and a cap closing the top of the tube.

3. In crank case oil gauge, a tube comprising upper and lower sections, said upper section being of larger outside diameter than the lower section, so that the gauge may be supported with the upper section outside of the crank case, a pair of plugs in the lower section, one each at the top and bottom thereof, each of said plugs having a hole extending therethrough, a float, said float being substantially the same diameter as the lower section, a wire extending from the float through said plugs and into the upper section, and a bead attached to the upper end of the said wire.

In testimony whereof, we affix our signatures.

GEORGE E. THOMAS.
LLOYD S. THOMAS.